United States Patent [19]

Dorf et al.

[11] Patent Number: 5,066,775

[45] Date of Patent: Nov. 19, 1991

[54] COPOLY ARYLENE/ALKYLENE SULFIDE

[75] Inventors: Ernst-Ulrich Dorf, Krefeld; Klaus Reinking, Wermelskirchen; Wolfgang Jakob, Moers; Erhard Tresper, Krefeld; Wolfgang Rüsseler, Krefeld, all of Fed. Rep. of Germany

[73] Assignee: Bayer Aktiengesellschaft, Leverkusen, Fed. Rep. of Germany

[21] Appl. No.: 475,267

[22] Filed: Feb. 5, 1990

[30] Foreign Application Priority Data

Feb. 16, 1989 [DE] Fed. Rep. of Germany ....... 3904706

[51] Int. Cl.$^5$ .............................................. C08G 75/16
[52] U.S. Cl. .................. 528/388; 525/333.7; 525/343; 525/346; 528/222; 528/226
[58] Field of Search ....................... 528/388, 222, 226; 525/333.7, 343, 346

[56] References Cited

U.S. PATENT DOCUMENTS 4,801,416  1/1989  Kobayashi et al. .............. 264/177.1

FOREIGN PATENT DOCUMENTS

| 0223099 | 5/1987 | European Pat. Off. |         |
|---------|--------|--------------------|---------|
| 3277242 | 11/1988 | Japan             | 528/388 |
| 3277243 | 11/1988 | Japan             | 528/388 |
| 3277244 | 11/1988 | Japan             | 528/388 |

OTHER PUBLICATIONS

Macromolecules, "Synthesis of Poly(Aliphatic sulfides) by Polycondensation"..., vol. 15, pp. 248-251, Mar.-Apr. 1982.
Patent Abstracts of Japan, vol. 11, No. 242, Aug. 1987.

*Primary Examiner*—Harold D. Anderson
*Attorney, Agent, or Firm*—Connolly and Hutz

[57] ABSTRACT

The invention relates to new sulphur-containing copolymers, a process for their preparation from a sulphur source and a mixture of dihalogenoaromatics and dihalogenoaliphatics and their use for the production of shaped articles.

3 Claims, No Drawings

COPOLY ARYLENE/ALKYLENE SULFIDE

The invention relates to new sulphur-containing copolymers, a process for their preparation from a sulphur source and a mixture of dihalogenoaromatics and dihalogenoaliphatics and their use for the production of shaped articles.

Polyphenylene sulphides (PPS) are known, for example, from U.S. Pat. No. 3,354,129 and EP-A 171 021. Because of their thermal and mechanical properties and their good chemical resistance, they are useful raw materials for the production of fibres, films and other shaped articles. They are used in particular in the electrical and electronics sector. They are flame-resistant and dimensionally stable and have a high long-term heat resistance and good electrical properties. However, the tracking resistance is lower e.g. in comparison with polyamide 6, polyalkylene terephthalate or polystyrene. PPS can be used in the high voltage sector only with limitations.

It is known e.g. that the tracking resistance of polyarylene sulphides (PAS) can be improved by additions of calcium sulphate (e.g. EP-A 87 145). The amount of calcium sulphate needed for this, however, impairs the mechanical properties of the shaped articles produced from the PPS modified in this way.

It is known from JP-A 62 048 727 that a seal of sodium mercaptide groups can be achieved on the end of the PAS chain, with a simultaneous increase in the rate of crystallization of the polymer, by reaction of dichloroaromatics and dichloroaliphatics with a sulphur source. It is expressly pointed out that the halogenoaliphatics employed do not undergo (co)polymerization under the reaction conditions chosen, "since excessively large amounts (of halogenoaliphatics) would interfere with the formation of the polyarylene sulphide chains". Masking of end groups occurs.

The object of the invention is therefore to develop polymers, the electrical properties of which, e.g. the tracking resistance, is improved in comparison with PPS but which nevertheless have the advantageous mechanical and thermal properties thereof.

It has now been found that new sulphur-containing copolymers of aromatic and aliphatic units have a considerably better tracking resistance than PAS. The products according to the invention have virtually the same mechanical properties as PPS and can be processed under the same conditions.

The invention relates to new, optionally branched sulphur-containing copolymers containing a) 60 to 99.5 mol %, preferably 75 to 99 mol %, of identical or different arylene sulphide units of the formula (I)

—Ar—S— (I), in which
Ar represents a radical of the formulae (II) to (IV)

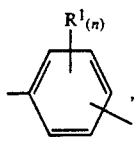

(II)

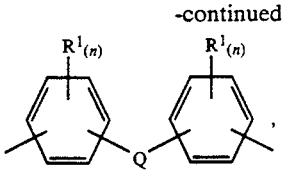

(III)

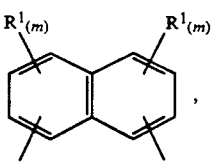

(IV)

in which
$R^1$ denotes identical or different radicals and can be hydrogen, $C_1$–$C_4$-alkyl, $C_5$–$C_{10}$-cycloalkyl, $C_6$–$C_{10}$-aryl, $C_7$–$C_{14}$-alkylaryl or $C_7$–$C_{14}$-arylalkyl, it being possible for two radicals $R^1$ in the ortho-position relative to one another to be linked, incorporating the adjacent C atoms in the ring, to form a $C_5$–$C_{14}$-ring which is aromatic or heterocyclic, containing up to three hetero atoms, such as N, O or S, Q represents a single bond or a group such as —$CR^1_2$—, —C(O)—, —S(O)—, —S(O)$_2$—, —$NR^1$—, —C(O)O—, —C(O)$NR^1$—, (—C(O))$_2$N—, —C(O)$NR^1$—Ar—$NR^1$C(O)— and —C(O)—Ar—C(O)—, wherein $R^1$ and Ar have the abovementioned meaning,
n represents the number 1, 2, 3 or 4 and
m represents the number 1, 2 or 3, and b) 0.5 to 40 mol %, preferably 1 to 25 mol %, of identical or different optionally branched $C_1$–$C_\infty$-alkylene sulphide units, preferably $C_2$–$C_\infty$-alkylene sulphide units, particularly preferably $C_6$–$C_{36}$-alkylene sulphide units.

The sequence of the units a) and b) in the aromatic-aliphatic polymers according to the invention can be random, alternating or block-like, preferably random or alternating.

The invention relates to a process for the preparation of the sulphur-containing copolymers according to the invention, characterized in that a) 60 to 99.5 mol %, preferably 75 to 99 mol %, based on the sum of a) and b), of identical or different dihalogeno-(hetero)aromatics, preferably dihalogenoaromatics, of the formulae (V), (VI) and/or (VII)

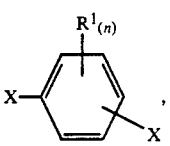

(V)

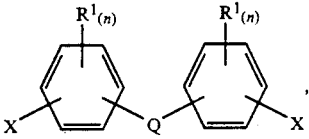

(VI)

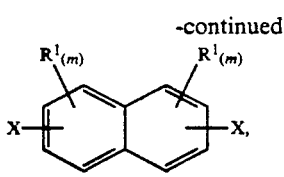

in which
X denotes halogen, such as chlorine or bromine,
R[1] denotes identical or different radicals and can be hydrogen, $C_1$-$C_4$-alkyl, $C_5$-$C_{10}$-cycloalkyl, $C_6$-$C_{10}$-aryl, $C_7$-$C_{14}$-alkylaryl or $C_7$-$C_{14}$-arylalkyl, it being possible for two radicals R[1] in the ortho-position relative to one another to be linked, incorporating the adjacent C atoms in the ring, to form a $C_5$-$C_{14}$-ring which is aromatic or heterocyclic, containing up to three hetero atoms, such as N, O or S, Q represents a single bond or a group such as —CR$^1_2$—, —C(O)—, —S(O)—, —SO$_2$—, —NR$^1$—, —C(O)O—, —C(O)NR$^1$—, (—C(O))$_2$N—, —C(O)NR$^1$—C(O)— and —C(O)—Ar—C(O)—, wherein R[1] has the abovementioned meaning, n represents the number 1, 2, 3 or 4 and
m represents the number 1, 2 or 3, and b) 0.5 to 40 mol %, preferably 1 to 25 mol %, based on the sum of (a+b), of identical or different, optionally branched $C_1$-$C_\infty$-dihalogenoaliphatics, preferably $C_2$-$C_\infty$-dihalogenoaliphatics, particularly preferably $C_6$-$C_{36}$-dihalogenoaliphatics, c) if appropriate 0.05 to 3 mol %, based on the sum of (a+b) of tri- or tetrahalogenoaromatics of the formula (VIII)

ArX$_n$ (VIII), in which
X represents halogen, such as chlorine or bromine,
Ar represents a $C_6$-$C_{24}$-aromatic or -heteroaromatic and
n represents the number 3 or 4, and/or
if appropriate 0.05 to 7.5 mol %, based on the sum of (a+b), of compounds for regulating the molecular weight, preferably monohalogeno- or monohydroxyaromatics of the formula (IX)

Ar$^1$—Y (IX), in which
Y represents hydroxyl, alkoxyl or halogen, such as chlorine or bromine, and
Ar[1] represents a $C_6$-$C_{24}$-aromatic or -heteroaromatic, or can be substituted via a unit Q, which has the meaning given in the case of formulae (IV) and (V), by further $C_6$-$C_{24}$-aromatics, and d) alkali metal sulphides, preferably sodium or potassium sulphide or a mixture thereof, together with alkali metal bisulphides, preferably sodium or potassium bisulphide or a mixture thereof, if appropriate in the form of their hydrates or aqueous mixtures, if appropriate together with catalysts or other auxiliaries, in e) a polar aprotic organic solvent, are reacted with one another at a temperature of 180° to 350° C., if appropriate under a pressure of up to 10$^3$ bar, the addition of the dihalogenoaliphatic(s) only taking place after complete dehydration of the reaction system.

The invention relates to the use of the new sulphur-containing copolymers, if appropriate mixed with customary fillers, reinforcing substances and auxiliaries and/or other polymers, for the production of shaped articles.

Examples of dihalogenoaromatics which can be employed according to the invention are 1,4-dichlorobenzene, 1,4-bromochlorobenzene, 1,4-dibromobenzene, 1,3-dichlorobenzene, 1,3-bromochlorobenzene, 4,4'-dichlorodiphenyl, 4,4'-dibromodiphenyl, 2,4'-dichlorodiphenyl, 4,4'-dichlorodiphenyl sulphide, 4,4'-dichlorodiphenyl sulphone, 4,4'-dichlorobenzophenone, 2,4-dichlorotoluene, 2,5-dichlorotoluene etc.

Examples of aliphatic chlorine and bromine compounds as dihalogenoaliphatics which can be employed according to the invention are 1,2-dichloroethane, 1,2-dichloropropane, 1,3-dichloropropane, 1,3-dichlorobutane, 2,3-dichlorobutane, 1,4-dichlorobutane, 1,2-dichloro-2-methylpropane, 1,3-dichloro-2,2-dimethylpropane, 1,5-dichloropentane, 1,6-dichlorohexane, 1,7-dichloroheptane, 1,8-dichlorooctane, 1,9-dichlorononane, 1,10-dichlorodecane, 1,11-dichloroundecane, 1,12-dichlorododecane, higher dichloroparaffins, saturated polymers, such as polyethylene, polypropylene and polyisobutylene with chlorine end groups etc.

Examples of branching agents of the formula (VI) which can be employed if appropriate are 1,2,4-trichlorobenzene, 1,3,5-trichlorobenzene, 1,3,5-tribromobenzene, 1,3,5-tris(4-chlorophenyl)-benzene, 1,3,5-tris(4-bromophenyl)benzene, 2,2',4,4'-tetrachlorodiphenyl, 2,2',4,4'-tetrachlorodiphenyl sulphide etc.

Examples of molecular weight regulators of the formula (VII) which can be employed if appropriate are phenol, alkali phenolate, bromobenzene, 4-chlorodiphenyl, 4-chlorodiphenyl sulphone, 4-chlorodiphenyl sulphide, 1-chloronaphthalene, 2-chloronaphthalene etc.

Examples of polar aprotic solvents are amides, such as hexamethylphosphoric acid triamide and N,N-dimethylformamide, sulphones, such as diphenyl sulphone, lactams, such as N-methylpyrrolidone and N-methylcaprolactam, heterocyclic compounds, such as N,N'-dimethylimidazolidinone etc.

Shaped articles in the context of the invention are extrudates, such as fibres, films, tubes, profiles etc., and injection-moulded components which have been obtained by standard processes.

If appropriate, the polymers according to the invention can be mixed with the customary amounts (up to about 300 wt. %) of customary fillers and reinforcing substances (Modern Plastics Encyclopaedia 1988, vol. 64 no. 10A, p. 183-194) and the customary auxiliaries (loc. cit., p. 127-178).

The shaped articles can moreover contain other polymers, if appropriate, such as non-modified polyarylene sulphides, polycondensates, polyaddates, polymers etc.

The copolymers according to the invention and the shaped articles produced from them are particularly suitable for uses in the electrical and electronics sector, in which, in addition to a high thermal and chemical stability and a high flame resistance, a high tracking resistance is required.

EXAMPLE 1

Preparation of polyphenylene sulphide as a comparison material 2,700 g N-methylcaprolactam and 611.5 g 1,4-dichlorobenzene are initially introduced under nitrogen into a 5 L reaction kettle fitted with a thermometer, stirrer, column which can be cooled, distillate divider and reflux condenser and two dropping funnels and the mixture is heated to the reflux temperature. A solution of 1,147.5 g sodium sulphide hydrate (about 60% sodium sulphide), 4.4 g sodium hydroxide and 141.1 g caprolactam is added dropwise so that the water fed in can at the same time be removed azeotropically with 1,4-dichlorobenzene. A further 611.5 g 1,4-dichlorobenzene are added to the reaction mixture at the same time. To maintain the stoichiometry, the 1,4-dichlorobenzene which distills off is recycled back to the batch, after removal of the water. When the addition has ended and when the dehydration has ended, the column is put under reflux, the batch is heated under reflux for a further 10 hours and the product is then isolated in the customary manner.

EXAMPLE 2

Procedure as example 1, but a total of 1,198.6 g 1,4-dichlorobenzene were added, and 25.8 g 1,6-dichlorohexane were added when the dehydration had ended.

+Yield = 820.3 g = 91%).

EXAMPLE 3

Procedure as in example 1, but a total of 1,100.8 g 1,4-dichlorobenzene were added, and 129.0 g 1,6-dichlorohexane were added when the dehydration had ended.

+Yield = 780.0 g = 86%).

EXAMPLE 4

26.1 g 1,6-dichlorohexane, 98.8 g 1,4-dichlorobenzene and 89.9 g of a previously dehydrated sodium sulphide (consisting of 67.8% Na$_2$S, 7.6% NaHS and 24.6% sodium aminocaproate) are initially introduced into 276 g N-methylcaprolactam, and the mixture is slowly heated to the reflux temperature and kept there for 12 hours.

The product is then precipitated in 4 l isopropanol and filtered off. The product is made into a mash in water, acidified, filtered off, washed free from electrolyte and dried in vacuo at 100° C. 73.3 g(=80%) of a white powder are obtained.

EXAMPLES 5 to 7

Preparation of moulding compositions of the polymers of examples 1 to 3. Other components:
GF: sized 6 mm glass fibres with a fibre diameter of about 10 μm
T: talc, particle diameter: 50% <3 μm

| Ex. | Polymer | % Polymer | % GF | % T |
|-----|---------|-----------|------|-----|
| 5   | ex. 1   | 40        | 30   | 30  |
| 6   | ex. 2   | 40        | 30   | 30  |
| 7   | ex. 3   | 40        | 30   | 30  |

The moulding compositions were prepared by mixing and homogenizing the components in the melt at a material temperature of about 300° to 320° C. on a twin-screw extruder ZSK 32 (Werner & Pfleiderer). The dried extruded granules were processed to standard test specimens on customary injection moulding machines and the specimens were tested in accordance with DIN and ASTM standards.

| Ex. | $\sigma_{bB}$ in MPa (DIN 53452) | $a_n$ in kJ/m$^2$ (ISO 180) | CTI in V (IEC 112) |
|-----|-----|-----|-----|
| 5 | 188 | 15 | 125 |
| 6 | 193 | 17 | 200 |
| 7 | 185 | 15 | 275 |

We claim:
1. Sulphur-containing copolymer consisting essentially of
a) 60 to 99.5 mol % of identical or different arylene sulphide units of the formula (I)

—Ar—S—     (I), in which
Ar represents a radical of the formula (II), (III) or (IV)

(II)

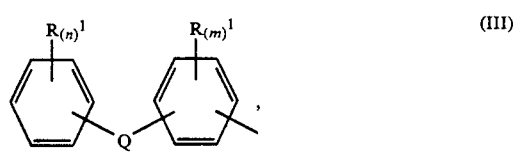

(III)

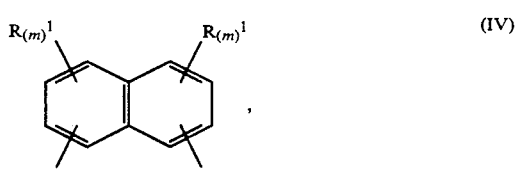

(IV)

in which
R$^1$ denotes identical or different hydrogen, C$_1$-C$_4$-alkyl, C$_5$-C$_{10}$-cycloalkyl, C$_6$-C$_{10}$-aryl, C$_7$-C$_{14}$-alkylaryl or C$_7$-C$_{14}$-arylalkyl, or two R$^1$'s in the ortho-position relative to one another together with the adjacent carbon atoms represent a C$_5$-C$_{14}$-ring which is aromatic or represent a C$_5$-C$_{14}$ heterocyclic when the two R$^1$'s are bridged by N, O or S hetero atoms,
Q represents a single bond or Q represents —CR$^1_2$—, —C(O)—, —S(O)—, —S(O)$_2$—, —NR$^1$—, —C(C)O—, —C(O)NR$^1$—, (—C(O))$_2$N—, —C(O)NR$^1$—Ar—NR$^1$C(O)— or —C(O)—AR—C(O)—, wherein R$^1$ and Ar are as defined supra,
n represents the number 1, 2 or 3 or 4,
m represents the number 1, 2 or 3,
b) 0.5 to 40 mol % of identical or different alkylene sulphide units and,
c) 0 to 3 mol % based on the sum of a) and b) of units of formula (VIII)

ArX$_p$     (VIII), in which
X represents halogen,
Ar represents a C$_6$-C$_{24}$-aromatic or -heteroaromatic and
p represents the number 3 or 4.

2. A process for preparing the sulphur-containing copolymers claimed in claim 4 which comprises reacting:

a) 60 to 99.5 mol percent, based on the sum of a) and b), of one or more compounds of the formulae (V), (VI) or (VII)

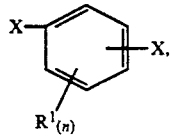  (V)

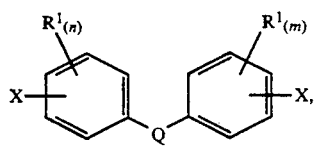  (VI)

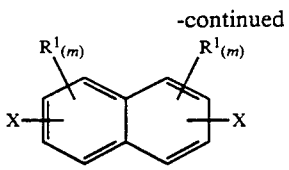  (VII)

wherein $R^1$, Q, m and n are defined supra and X is a halogen, b) 0.5 to 40 mol percent, based on the sum of a) and b), of dihaloalkane, c) 0.05 to 3 mol percent, based on the sum of a) and b), of a tri- or tetra-haloaromatic compound of the formula $ArX_p$(VIII) wherein Ar, X and p are defined supra, d) alkali metal sulphide, and e) a polar aprotic organic solvent, wherein the reaction is at a temperature from 180° to 350° C. and component a) is added to the reaction only after complete dehydration of the reaction system.

3. Shaped article of the copolymer of claim 1.

* * * * *